United States Patent [19]

Bates et al.

[11] Patent Number: 4,457,459
[45] Date of Patent: Jul. 3, 1984

[54] VALVE SUITABLE FOR CONTROLLING TEEMING FROM FURNACE TAPHOLES

[75] Inventors: Kenneth W. Bates, Calow; William A. Griffiths, Newbold; Norman H. Watts, Burlington Grove, all of England

[73] Assignee: USS Engineers and Consultants, Inc., Pittsburgh, Pa.

[21] Appl. No.: 370,716

[22] Filed: Apr. 22, 1982

[51] Int. Cl.$^3$ .............................................. B22D 41/00
[52] U.S. Cl. .................................. 222/599; 222/597; 222/594; 222/591
[58] Field of Search ............... 222/600, 599, 597, 594, 222/591, 509, 505, 504, 511, 512, 540, 544, 550, 559

[56] References Cited

U.S. PATENT DOCUMENTS 3,901,418  8/1975  Klaus et al. ........................ 222/600
3,937,372  2/1976  Bode .............................. 222/512 X Primary Examiner—Joseph J. Rolla
Assistant Examiner—T. Fitzgerald
Attorney, Agent, or Firm—John F. Carney

[57] ABSTRACT

Metal flow from furnace taphole to a pouring trough is controlled by a valve interposed therebetween, the valve having a stationary orificed valve plate and a companion slide plate for closing or opening the orifice to flow. An actuating beam member forming part of a parallel motion linkage extends upwardly and obliquely from the slide plate, the actuating member being thrust against the slide plate by a swinging spring strut of the linkage. A ram connected to the linkage via a crank, a shaft and a pivoted lever displaces the linkage when extended or contracted and this moves the actuating member along a predetermined path, its oblique attitude being preserved, to open or shut the valve.

11 Claims, 4 Drawing Figures

4,457,459

VALVE SUITABLE FOR CONTROLLING TEEMING FROM FURNACE TAPHOLES

BACKGROUND OF THE INVENTION

The present invention relates to a valve suitable for controlling teeming from a furnace taphole e.g. of an arc furnace.

When an arc furnace is tapped conventionally, molten metal and slag flow over the furnace pouring lip as the furnace is tilted. The metal and slag then run down a trough, where such is provided, and gather in a ladle. The presence of slag is a considerable inconvenience. Thus, it would be advantageous to be able to empty the furnace of its molten metal and to leave the slag behind.

By providing the furnace with a taphole located well below the top thereof, it is possible to pour off the molten metal alone when the furnace is tilted. Some form of stopper is needed to close the taphole until pouring is to take place. Better still would be a valve openable and closable at will, for this would facilitate the filling of several ladles from one furnace charge, and the furnace would only need tilting once, at the start of the emptying operation.

In principle a sliding gate valve might appear suitable for controlling flow out of the taphole. However, no known sliding gate valve is suitable. The known valve mechanism occupy considerable space to either side thereof i.e. along the direction of movement of the sliding valve plate. Adequate space is absent in the region of a furnace taphole, however, in part due to the presence of the pouring trough.

SUMMARY OF THE INVENTION

An object of the present invention has been to adapt the sliding gate valve concept to suit a furnace taphole arrangement, and a mechanism has been devised in which the sliding valve plate is biased towards the taphole and is moved to and fro from above the trough.

According to the present invention, there is provided a valve mechanism for controlling metal flow from a furnace taphole, comprising an orificed stationary valve plate, a companion slideable valve plate for covering or exposing the orifice of the former to close or open the valve to flow, an actuating member for moving the slide plate which extends obliquely thereto and by spring means acting thereon is biased thereagainst to press the slide plate to the stationary plate, and means guiding the actuating member for displacement along a predetermined path wherein a portion of the actuating member engaging the slide plate moves in a plane parallel to the contacting faces of the valve plates.

The invention also comprehends a furnace having a taphole in its wall, a pouring trough for conveying metal teemed through the taphole to a receiver vessel, and a valve mechanism as defined in the preceding paragraph located between the taphole and the trough, the actuating member extending obliquely and upwardly away from the trough, and the spring means and guide means being located on the opposite side of the slide plate from the pouring trough.

The guide means for the actuating member is for example a parallel motion device, whereby the oblique attitude of the actuating member is preserved during displacement thereof for opening and closing the valve.

In a preferred embodiment, the guide means for the actuating member is a linkage of which the actuating member is part, the linkage comprising a pair of oscillatingly movable levers each pivotally connected to the actuating member and to a support structure of the mechanism, and one of the levers is a spring strut and constitutes the spring means which biases the actuating member against the slide plate.

Conveniently, the spring strut is pivoted to an anchorage carried by the support structure and braced thereto by a toggle linkage, the latter being operable to release the anchorage and thereby relieve the biasing of the spring strut on the actuating member. Having relieved the biasing, servicing of the valve and replacement of its valve plates becomes a routine procedure.

Although the present valve has been devised particularly with furnaces in mind, it has application to other vessels. Thus, the compact form of the valve and the location, to one side of a vessel teeming opening, of its structure for biassing and for moving the slide plate to and fro may be found of significant convenience for some ladles, tundishes and other vessels from which molten metal is to be teemed.

BRIEF DESCRIPTION OF THE DRAWINGS

The invention will now be described in more detail by way of example with reference to the accompanying drawings, in which.

DESCRIPTION OF A PREFERRED EMBODIMENT OF THE INVENTION

Figure 3:
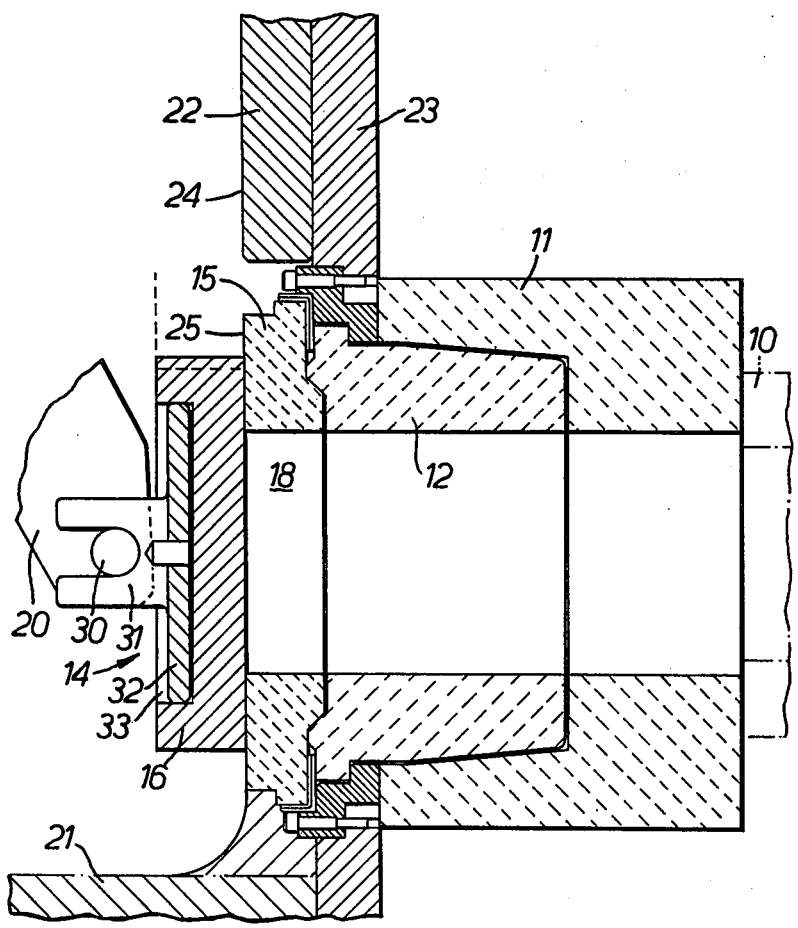
FIG. 3 is an enlarged sectional view of the valve arrangement and ducting leading thereto from the taphole.

Referring first to FIG. 3, refractory components of the tapping channel through which molten metal flows from taphole to trough are shown. A taphole insert 10 is positioned in the furnace taphole, the insert 10 having a flow passage of oval cross-section. Abuttingly sealed to the taphole insert 10 is an intermediate duct 11 having a flow passage which changes from oval to circular cross section at the valve. A nozzle piece 12 is cemented into the valve end of duct 11. The valve 14 is disposed at the end of the nozzle piece 12 remote from the taphole, and is sealed thereto.

Figure 1:
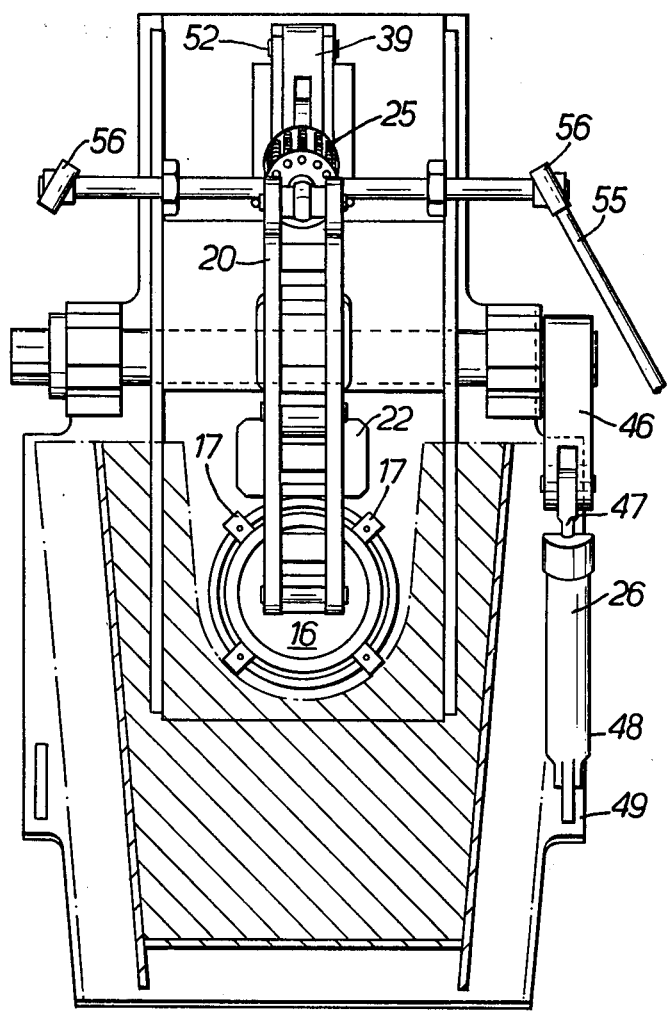
FIG. 1 is a front elevational view of an arc furnace fitted with a taphole valve mechanism according to the invention.

In essence, the valve 14 comprises a stationary apertured valve plate 15 of ring form and a slide plate 16 of disc form biased thereagainst. Clamps 17 (FIG. 1) secure the plate 15 in abutment with nozzle piece 12. The slide plate 16 is movable in an upward direction, to uncover the opening 18 in the stationary plate 15 and thus open the tapping channel, by an actuating member 20 which is also arranged to thrust the plate 16 against the plate 15. When the tapping channel is opened by raising the slide plate 16, metal flows from the furnace through the taphole insert 10, the intermediate duct and the stationary plate 15, issuing from the latter into pouring trough 21. Metal flows then down the trough into the receiving vessel or ladle.

When the slide plate 16 is shifted upwardly to open the valve 14 completely it travels a distance almost equal to its diameter. The width of the ringshaped plate 15, that is the difference between its inner and outer radii, is substantially smaller than the aforesaid distance. Means is therefore provided to support the slide plate 16 as it is moved upwardly. The said means is a thrust plate 22 mounted adjacent the plate 15 on a frame member 23 of the valve. The thrust plate 22 and stationary plate 15 have coplanar slide plate contact surfaces 24, 25.

Figure 2:
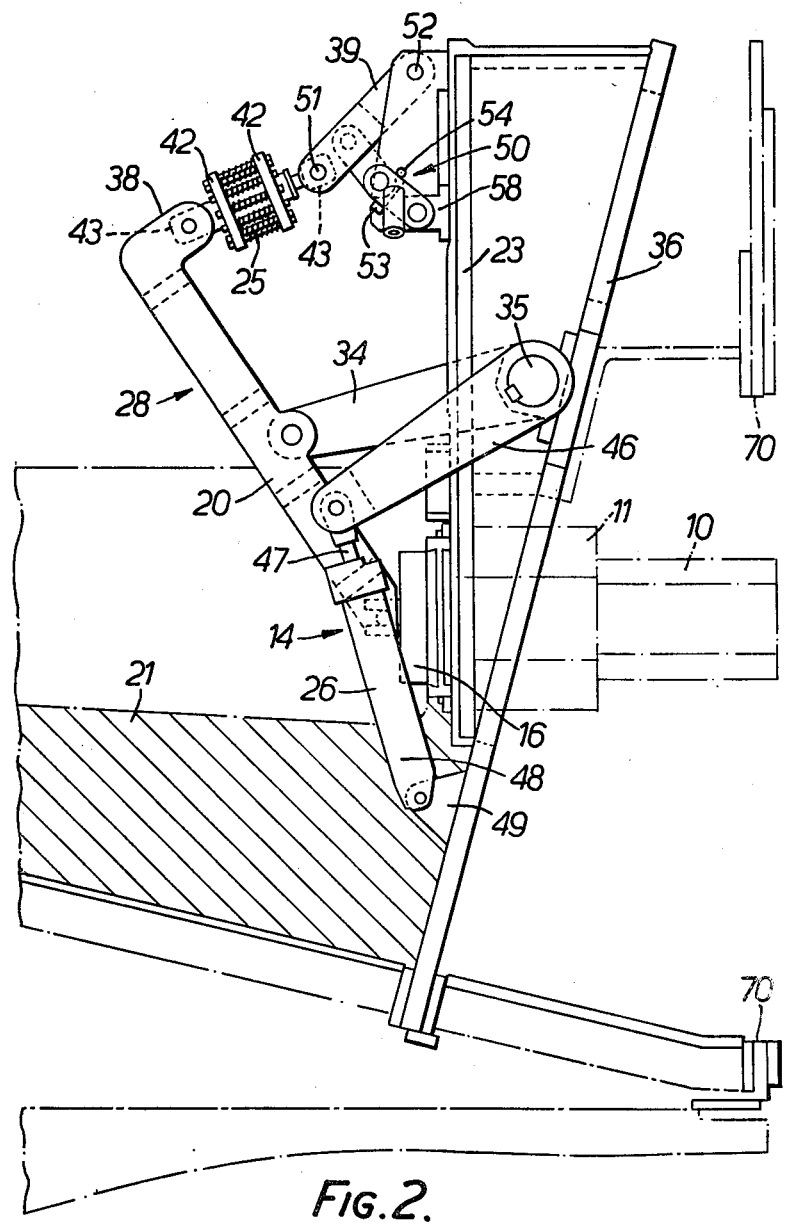
FIG. 2 is a side elevational view of the equipment shown in FIG. 1, illustrating the valve mechanism more clearly.

The valve mechanism will now be described with particular reference to FIGS. 2 and 3.

The actuating member 20 for the slide plate 16 performs two functions. First, it biases the slide plate 16 against the stationary plate 15, thanks to spring means 25 acting on the actuating member. Secondly, it operates to displace the slide plate 16 when an actuator 26 is suitably energised. The actuator member 20 is a beam forming part of a linkage 28 so designed that the lower end of the actuator member moves in a vertical path as the actuator 26 is operated.

As illustrated, the actuator member 20 is inclined to the vertical, and to frame member 23, and has its lower end coupled to the slide plate. The coupling comprises a pin 30 which is received in a yoke 31 forming part of a shoe 32 mounted in a recess 33 in the slide plate 16, see FIG. 3.

At an intermediate point along its length, the actuator member 20 is pivotally secured to a lever 34 fast with a pivot shaft 35 journalled to a second frame member 36 of the mechanism.

The actuating member 20 extends beyond lever 34 and has its upper end 38 coupled to the frame member 23. The spring means 25, which constitutes a spring link, couples the beam to the frame member 23 by way of a lever 39 and toggle arrangement 50, to be described. The spring means is pivotally connected at its opposite ends to the lever 39 and end 38, respectively.

The spring means 25 is a device comprising a multiplicity of compression springs, e.g. ten or twelve, which are threaded on a corresponding plurality of bolts holding a pair of thrust plates 42 together. The thrust plates 42 each have a projecting eye or clevis 43 by which the spring means is secured to lever 39 and the end 38. In the operative condition shown in FIG. 2, the spring means is in a state of compression, and tends to rotate the activating member 20 anticlockwise about its pivotal connection with lever 34. Thus, the lower end of the actuating member 20 is biased towards the taphole, and the slide plate 16 is thrust into firm, sealing contact with the stationary plate 15.

The spring means 25 could include a set of Bellville washers instead of coil springs if desired.

For displacing the slide plate between its open (raised) and closed (lowered) positions, the actuator 26 is linked via a crank 46 to the linkage 28. The crank 46 is fast at one end with the shaft 35 on which the lever 34 is also fast. The actuator 26 is pivoted to the opposite end of the crank 46 and when this end is displaced upwardly, the shaft 35 is rotated clockwise and with it lever 34. This action serves to displace the actuator member 20 and the slide plate 16 upwardly, to open the valve.

As shown in the drawings, the actuator 26 is an hydraulic or pneumatic ram. This has its piston rod 47 pivoted to the crank 46 and its body 48 remote from the piston rod pivoted to a lug 49 on the frame member 23.

Use of such an actuator is conventional in the sliding gate art, but other actuators could be substituted. For instance, the crank 46 could be actuated by, or even replaced by, an appropriate manual control lever.

The linkage 28, comprising actuating member 20, lever 34 and spring means 25, acts approximately as a parallel motion device. The geometry of lever 34 and spring means 25 is such as to constrain the actuating member 20 to move substantially parallel to itself. By this means, the lower end of the actuator moves vertically with the slide plate and changes in thrust which it exerts upon the slide plate 16 are kept within safe bounds as the latter is moved vertically by the actuating member 20.

The spring means 25 acts as a swing link in the linkage 28. It swings, in the same direction as the lever 34, about an anchorage 51 at the free end of lever 39 which is pivoted at 52 to the frame member 23. In normal use, however, the lever 39 is barred from pivoting about the pivot at 52 by the toggle arrangement 50. The effort developed by the spring means 25 tends to rotate lever 39 anticlockwise about 52. Such rotation is prevented, however, by the toggle 50 acting as a rigid brace between the lever 39 and frame member 23, thanks to the toggle bearing against a stop 53. Overcentering of the toggle would be necessary if the lever 39 were to move in the opposite direction about 52, so this movement is resisted and moreover is positively prevented by a removable safety pin 54. In normal usage the parts retain the configuration shown in FIG. 2, when the anchorage 51 is fixed.

On occasion, it will be necessary to replace one or both the plates 15, 16. The spring-developed thrust on plate 16 normally exceeds 5 tons, in the valve-closed setting and must be released for servicing This is accomplished by freeing the anchorage 51 by manipulation of the toggle 50. First, the safety pin 54 is removed. When, crowbars 55 are located bosses 56 at the ends of a rod passing through the centre of the toggle 50, and forming the centre pivot thereof. Thereafter the crowbars are levered so as to overcentre the toggle 50 and allow the lever 39 to swing anticlockwise about its pivot at 52. This movement is accompanied by relaxation of the spring means 25, which can then for convenience be disconnected from the anchorage 51. Having released the spring biasing in this way, the actuating member 20 can be swung away from the valve allowing clear access thereto. Restoration of the spring biasing is in substance a reverse of the foregoing steps, as will be recognised.

In the present embodiment, the linkage 28 only approximates to a parallel motion device. This is since the connections between the actuating member 20, the lever 34 and spring means 25 do not move in arcs of equal radius about centres through the shaft 35 and anchorage 51. The geometry of the system, that is the respective lengths of lever 34 and spring means 25 coupled with the positions of their swing centres through 35 and 51, act to minimise changes in the oblique attitude of the actuating member 20 as the actuator 26 is extended or contracted. As a result, the biasing thrust acting on the slide plate changes but only within safe limits and is at a maximum when the valve 14 is closed.

EXAMPLE

Figure 4:
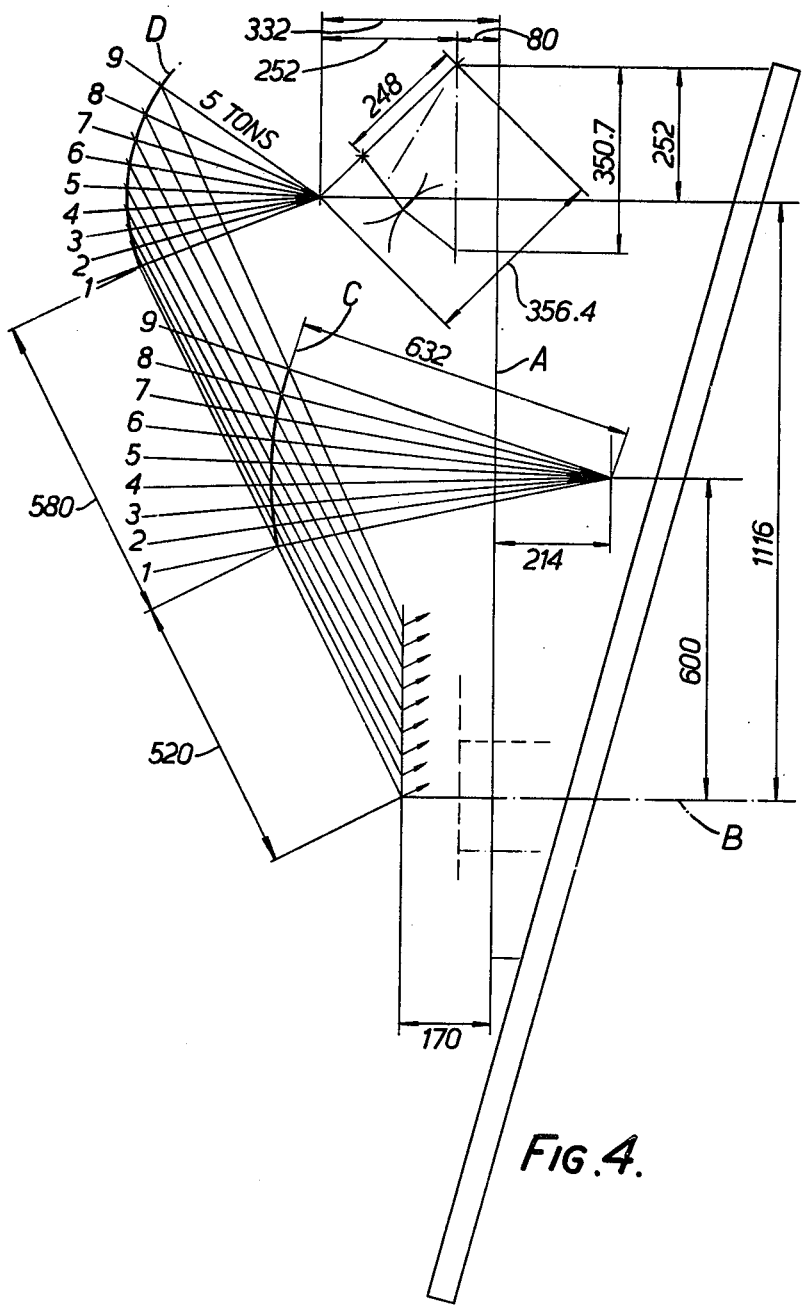
FIG. 4 is a diagrammatic geometrical analysis of the valve mechanism.

A specific example of the geometry of a taphole valve system according to this invention is presented in FIG. 4 of the drawings.

In this example, the valve slide plate has a diameter of the order of 335 mm and a throw, or travel of 320 mm between valve-open and valve-closed settings.

The spring means 25 comprises twelve compression coil springs, is 385 mm long when relaxed and 360 mm long when compressed. The load on each spring is 950 lbs (431 kg) and the springs push the thrust plates 43 apart with an aggregate force of 5 tons (5080 kg).

With the left hand face A of frame member 23 and the centreline B of the pouring passage as datums, the mechanism has the following dimensions:

the distance between the two pivot axes of lever 34 is 632 mm and pivot axis through shaft 35 is centred 600 mm above B and 214 mm to the right of A;

in the normal operative condition, the pivot axis through the anchorage 51 is centred 1116 mm above B and is 332 mm to the left of A;

pivot point 52 of lever 39 is situated 80 mm to the left of A and 1368 mm above B;

the toggle 50 is connected by a pivot pin to a lug 58 fast with the frame member 23; the pin is centred 80 mm to the left of A and 1017 mm above B. The connection between the toggle 50 and the lever 39 is 248 mm from pivot point 52, the distance between the latter and the centre of the fixed anchorage being 356 mm. The links of the toggle each have their two pivot apertures 125 mm apart; and the actuator member 20 is 1100 mm long, the lever 34 being pivoted thereto at a centre 580 mm from the centre of the attachment of spring means 25 thereto and 520 mm from the pin 30 coupling the actuating member 20 to the slide plate 16; the pin 30 is centred 170 mm to the left of A.

In operation, when the lever 34 is swung clockwise or anticlockwise on the shaft 35, the actuating member 20 is displaced substantially parallel to itself, the motion of its lower end being confined to a vertical plane. The pivotal connection between the lever 34 and the actuating member moves along arcuate path C, while the pivotal connection between the spring means 25 and the actuator moves along the approximately parallel arcuate path D.

The force exerted by the spring means 25 on the actuating member 20 normal thereto is at a maximum in the valve-closed setting. When the valve is opened, the normal resolved force falls, owing to the swinging motion of the spring means 25 about anchorage 51 reducing the angle between the spring means and the longitudinal axis of the actuating member 20. It follows that the force applied in a direction normal to this axis by the actuating member 20 on the slide plate 16 similarly drops as the valve 14 is opened.

The following tabulation gives the forces applying as the slide plate is raised from its valve closed setting (1) to the limit of its travel (9), through evenly-spaced intermediate positions.

| Position | Force of spring means on actuating member normal thereto | | Force normal to actuating member exerted on slide plate | | Thrust on slide plate resolved normal thereto | |
| --- | --- | --- | --- | --- | --- | --- |
| | Tons | kg | Tons | kg | Tons | kg |
| 9 | 2.59 | 2631 | 2.89 | 2936 | 2.62 | 2662 |
| 8 | 3.15 | 3200 | 3.51 | 3566 | 3.15 | 3200 |
| 7 | 3.60 | 3657 | 4.02 | 4084 | 3.55 | 3607 |
| 6 | 3.98 | 4043 | 4.44 | 4511 | 3.90 | 3962 |
| 5 | 4.34 | 4409 | 4.84 | 4917 | 4.25 | 4318 |
| 4 | 4.60 | 4674 | 5.13 | 5212 | 4.50 | 4572 |
| 3 | 4.74 | 4816 | 5.29 | 5375 | 4.66 | 4735 |
| 2 | 4.85 | 4928 | 5.41 | 5497 | 4.80 | 4877 |
| 1 | 4.94 | 5019 | 5.51 | 5598 | 4.95 | 4663 |

In this example, the mechanical advantage of the actuating member 20 is 580/520 or 1.115.

From the foregoing it will be appreciated that the means for biasing the slide plate 16 into sealed contact with the stationary plate 15 and the means for drawing the slide plate 16 aside to open the valve 14 are disposed to one side of the mechanism, and to one side of the pouring passage. The valve arrangement commends itself for any situation where space to one side of a pouring passage is limited. Thus, use of the arrangement is not confined to furnace taphole control.

Various modifications will be apparent to the addressee. For example, the actuator could act otherwise than through lever 46 and shaft 35 for displacing the linkage 28. Thus, as one possibility the actuator could be coupled to the pin 30. In principle, the spring means 25 could act on the actuating member 20 at any point thereon between lever 34 and the slide plate 16, the spring means then functioning in tension. The positions of the lever 34 and the spring means could then be interchanged.

In the specific embodiment the linkage is so designed that the bottom end of the actuating member 20 travels vertically. In a modification, the linkage 28 could be replaced by a vertically-extending guide in which the bottom end of the actuating member 20 moves.

The furnace/valve arrangement has the valve 14 and its mechanism located between the furnace wall 70 and the trough 21, the valve being connected by suitable ducting to the furnace taphole. Attachment of the valve mechanism to the furnace wall can be accomplished in various ways and no description of the attachment appears warranted here.

We claim:

1. A valve mechanism for controlling metal flow from a furnace taphole, comprising an orificed stationary valve plate, a companion slideable valve plate for covering or exposing the orifice of the former to close or open the valve to flow, an actuating member for moving the slide plate which extends obliquely thereto and is by a biased spring means acting thereon to press said slide plate to the stationary plate, and means guiding the actuating member for displacement along a predetermined path wherein a portion of the actuating member engaging the slide plate moves in a plane parallel to the contacting faces of the valve plates.

2. A mechanism according to claim 1, wherein the guide means for the actuating member is a parallel motion device, whereby the oblique attitude of the actuating member is preserved during displacement thereof for opening and closing the valve.

3. A mechanism according to claim 2, wherein the guide means for the actuating member is a linkage of which the actuating member is part, the linkage comprising a pair of oscillatingly movable levers each pivotally connected to the actuating member and to a support structure of the mechanism.

4. A mechanism according to claim 3, wherein one of the levers is a spring strut and constitutes the spring means which biases the actuating member against the slide plate.

5. A mechanism according to claim 4, wherein the spring strut is pivoted to an anchorage carried by the support structure and braced thereto by a toggle linkage, the latter being operable to release the anchorage and thereby relieve the biasing of the spring strut on the actuating member.

6. A mechanism according to claim 5, wherein the anchorage is on a lever pivoted to the frame but normally barred from pivoting by the toggle linkage.

7. A mechanism according to claim 4, 5 or 6, wherein the spring strut acting on the actuating member is in a state of compression and is located further from the slide plate than the other lever of the linkage.

8. A mechanism according to claim 7, wherein the pair of levers have such lengths, and their pivotal connections with the support structure are so located relative to the plane of the contacting faces of the valve plates, that the oblique attitude of the actuating member is preserved when displaced to open or close the valve.

9. A mechanism according to claim 8, including an actuator operable for displacing the actuating member.

10. A mechanism according to claim 9, wherein the actuator is an hydraulic or pneumatic ram.

11. A mechanism according to claim 10 wherein the actuator acts on a crank fast with a shaft on which one of the levers pivotally connected to the actuating member is also fast, said shaft being journalled to the support structure.

* * * * *

UNITED STATES PATENT AND TRADEMARK OFFICE
CERTIFICATE OF CORRECTION

PATENT NO. : 4,457,459

DATED : July 3, 1984

INVENTOR(S) : Kenneth W. Bates, William A. Griffiths and Norman H. Watts

It is certified that error appears in the above-identified patent and that said Letters Patent is hereby corrected as shown below:

Column 4, line 33, change "When" to -- Then --;

Column 4, line 34, after "located", insert -- in --.

Signed and Sealed this

Eighth Day of January 1985

[SEAL]

Attest:

Attesting Officer

GERALD J. MOSSINGHOFF

Commissioner of Patents and Trademarks